United States Patent [19]

Björshol

[11] 4,205,479
[45] Jun. 3, 1980

[54] FISHING HOOK WITH THICKENED NECK PORTION AND COOPERATING SNOOD HEAD

[76] Inventor: Kolbjörn Björshol, 6560 Langöyneset, Norway

[21] Appl. No.: 924,573

[22] Filed: Jul. 14, 1978

Related U.S. Application Data

[63] Continuation of Ser. No. 686,101, May 13, 1976, abandoned.

[30] Foreign Application Priority Data

May 16, 1975 [NO] Norway .................................. 751750

[51] Int. Cl.² ............................................. A01K 83/00
[52] U.S. Cl. ................................... 43/44.86; 43/44.92
[58] Field of Search ............... 43/43.16, 44.82, 44.83, 43/44.84, 44.85, 44.86, 44.93, 44.92, 44.95, 42.38; 24/217 R; 248/339; 85/29

[56] References Cited

U.S. PATENT DOCUMENTS

| 1,741,034 | 12/1929 | Newton | 43/43.16 |
| 2,533,062 | 12/1950 | Spink | 85/29 X |
| 3,091,885 | 6/1963 | Ulsh | 43/44.83 X |
| 3,210,883 | 10/1965 | Ulsh | 43/44.83 X |
| 3,286,391 | 11/1966 | Mengeringhausen | 24/217 X |
| 3,513,747 | 5/1970 | Dirks | 248/339 X |
| 3,848,080 | 11/1974 | Schmidt | 85/29 |
| 3,898,760 | 8/1975 | Klein | 43/44.83 |

*Primary Examiner*—Nicholas P. Godici
*Attorney, Agent, or Firm*—Watson, Cole, Grindle & Watson

[57] ABSTRACT

The invention relates to a fishing hook and a line snood head so formed as to be adapted to co-operate in removably securing the hook to the head.

7 Claims, 1 Drawing Figure

U.S. Patent  Jun. 3, 1980  4,205,479
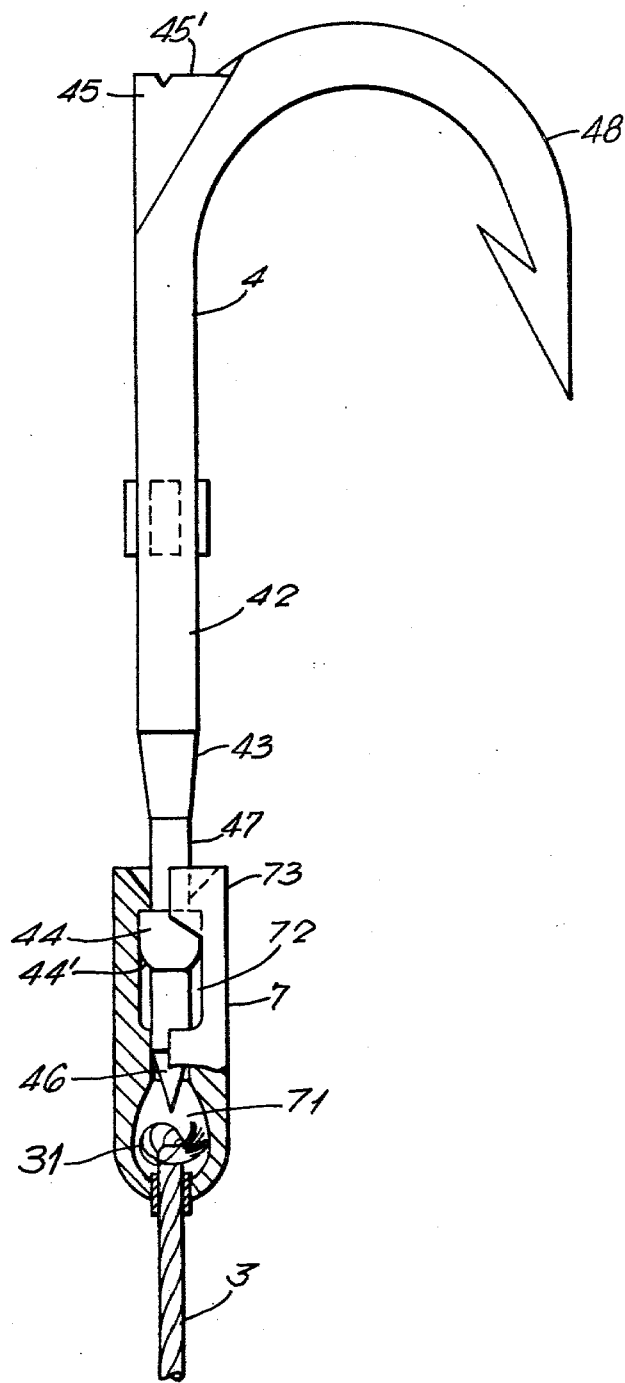

FISHING HOOK WITH THICKENED NECK PORTION AND COOPERATING SNOOD HEAD

This is a continuation of application Ser. No. 686,101 filed May 13, 1976, now abandoned.

BACKGROUND OF THE INVENTION

In long-line fishing, also called either great-line fishing, boulter, or trot fishing, a line is used which is provided with a great number of hooks each connected to the line through a so-called snood. During fishing, each hook is provided with a bait, and when the line is not in use, care must be taken that the line and the appertaining snoods are to the greatest possible extent prevented from being tangled or knotted.

The present invention relates to a fishing hook and a line snood head adapted to cooperate for the purpose of facilitating the fitting of each snood head with a hook and the removal of such hook, so that a line provided with a number of snoods may be stored in a tub or the like from which it is easily drawn for re-use, without any danger of tangling.

SUMMARY OF THE INVENTION

According to the invention, a fishing hook is provided with a hook neck which has a thickened portion and a cavity therein such that the thickened portion of the hook neck is positionable in the cavity of the snood head.

DESCRIPTION OF THE FIGURE

Further features of the invention will appear from the following description, taken with reference to the accompanying FIGURE, which is a side view, partly in section, of a snood head in engagement with the neck of a fishing hook according to the present invention.

DESCRIPTION OF THE PREFERRED EMBODIMENT

As shown in the FIGURE, a snood head 7 consists of a substantially cylindrical hollow body which at one end is provided with a cavity 71 adapted to receive the knot 31 of a snood 3, and a second cavity 72 spaced from the cavity 71 adapted to receive and hold a thickened neck portion 44 of the elongated neck portion 42 of a fishing hook 4, the snood head 7 being at this end provided with an opening of smaller diameter than the diameter of the thickened neck portion 44. Thus, the fish hook 4 includes a curved barb end portion 48, an elongated neck portion 42, a tapered portion 43, an extension portion 47, and a thickened neck portion 44. The walls of the top cavity 72 are made elastically yielding, for instance by means of longitudinally extending slots 73, so that the walls may yield when the hook thickened neck portion 44 is introduced or withdrawn. Curved entry surface 44' of thickened neck portion 44 also helps with insertion of the fish hook 4 into the cavity 72.

In order that the hook be not subjected to undue stresses when the neck portion 44 is introduced into the cavity 72, the hook may be provided with a projection 45 presenting a substantially even top surface adapted to serve as a blow-receiving face to a blow tool. In other words, the projection 45 of the elongated neck portion 42 has a blow-receiving face 45' which extends at a right angle to the elongated direction of the elongated neck portion 42.

The fish hook 4 is also shown to be provided with a pointed end for the double purpose of facilitating the entry of the neck into the cavity of the head 7 and of penetrating a bait which may, possibly, be placed on top of the snood head during the inter-connection of the hook neck and the snood head, as described in the copending application Ser. No. 686,099, filed on May 13, 1976 now abandoned.

I claim:

1. A fishing hook which comprises an elongated neck portion, one end of which is connected to a barb end portion which curves away from the elongated direction of said neck portion in a certain direction, both said elongated neck portion and said curved barb end portion having substantially uniform cross-sectional dimensions; a tapered portion directly connected to a second end of said elongated neck portion; said tapered portion extending away from said elongated neck portion with decreasing cross-sectional dimensions as compared to the cross-sectional dimensions of said elongated neck portion; means integral with said one end of said elongated neck portion forming a projection which has a generally flat face which extends at a right angle to the elongated direction of said elongated neck portion and in a direction generally opposite to the direction the barb end curves away therefrom and which is capable of receiving mechanical blows acting longitudinally of the elongated neck portion; means including a thickened neck portion connected to said tapered portion, said thickened neck portion being adapted to be received in, held by, and released from a snood head.

2. The fishing hook of claim 1, wherein said means connected to said tapered portion includes an extension portion, said extension portion being connected at one end to said tapered portion and at the other end to said thickened neck portion.

3. The fishing hook of claim 2, wherein said means connected to said tapered portion includes a pointed end portion extending away from said thickened neck portion.

4. The fishing hook of claim 3, wherein said thickened neck portion has a curved entry surface adjacent said pointed end portion extending away therefrom.

5. A combination fishing hook and snood head comprising (a) a fishing hook which comprises an elongated neck portion, one end of which is connected to a barb end portion which curves away from the elongated direction of said neck portion in a certain direction, both said elongated neck portion and said curved barb portion having substantially uniform cross-sectional dimensions; a tapered portion directly connected to a second end of said elongated neck portion; said tapered portion extending away from said elongated neck portion with with decreasing cross-sectional dimensions as compared to the cross-sectional dimensions of said elongated neck portion; means integral with said one end of said elongated neck portion forming a projection which has a generally flat face which extends at a right angle to the elongated direction of said elongated neck portion and in a direction generally opposite to the direction the barb end curves away therefrom and which is capable of receiving mechanical blows acting longitudinally of the elongated neck portion; means including a thickened neck portion connected to said tapered portion, said thickened neck portion being adapted to be received in, held by, and released from a snood head;

(b) a snood head comprising means forming a substantially cylindrical hollow body; means extending radially inwardly from said means forming said substantially cylindrical hollow bed so as to divide said body into two inferior cavities; means at one end of said substantially cylindrical hollow body providing an opening into one of said two cavities for the thickened neck portion of said fishing hook; and means at the opposite end of said substantially cylindrical hollow body providing an opening into the second of said two cavities for receipt of a snood therethrough.

6. The combination of claim 5, wherein said means forming said opening into one of said two cavities of said snood head forms an opening which is smaller in dimensions than the dimensions of the thickened neck portion of the fishing hook, and wherein said means forming said opening into said one of said two cavities is elastically yieldable such that the thickened neck portion of the fishing hook of (a) can pass therethrough and thereafter retain said thickened neck portion in said one cavity.

7. The combination of claim 5, wherein said radially inwardly extending means has means forming a hole therein.

* * * * *